(12) United States Patent
Tan

(10) Patent No.: US 8,321,449 B2
(45) Date of Patent: Nov. 27, 2012

(54) MEDIA RATING

(75) Inventor: Min-Liang Tan, Carlsbad, CA (US)

(73) Assignee: JOOK Inc., Carlsbad, CA (US)

( * ) Notice: Subject to any disclaimer, the term of this patent is extended or adjusted under 35 U.S.C. 154(b) by 729 days.

(21) Appl. No.: 11/970,016

(22) Filed: Jan. 7, 2008

(65) Prior Publication Data

US 2008/0177781 A1  Jul. 24, 2008

Related U.S. Application Data

(63) Continuation-in-part of application No. 11/625,692, filed on Jan. 22, 2007, now Pat. No. 7,817,960.

(51) Int. Cl.
*G06F 17/30* (2006.01)

(52) U.S. Cl. ....................................................... 707/767

(58) Field of Classification Search .................... 707/767
See application file for complete search history.

(56) References Cited

U.S. PATENT DOCUMENTS

| | | | |
|---|---|---|---|
| 5,515,106 A * | 5/1996 | Chaney et al. .................. | 725/48 |
| 5,931,901 A * | 8/1999 | Wolfe et al. .................... | 709/206 |
| 5,950,172 A * | 9/1999 | Klingman ........................ | 705/26 |
| 6,169,543 B1 * | 1/2001 | Wehmeyer ...................... | 725/47 |
| 6,348,932 B1 * | 2/2002 | Nishikawa et al. ............. | 715/719 |
| 6,351,270 B1 * | 2/2002 | Nishikawa et al. ............. | 715/717 |
| 6,405,175 B1 * | 6/2002 | Ng .............................. | 705/14.26 |
| 6,481,010 B2 * | 11/2002 | Nishikawa et al. ............. | 725/44 |
| 6,546,421 B1 * | 4/2003 | Wynblatt et al. ............... | 709/225 |
| 6,591,292 B1 * | 7/2003 | Morrison et al. .............. | 709/206 |
| 6,601,238 B2 * | 7/2003 | Morrison et al. ............... | 725/50 |
| 6,748,237 B1 * | 6/2004 | Bates et al. ................. | 455/553.1 |
| 6,966,064 B1 * | 11/2005 | Schneidewend et al. ........ | 725/41 |
| 6,973,663 B1 * | 12/2005 | Brown et al. .................... | 725/39 |
| 6,990,635 B2 * | 1/2006 | Kurapati et al. ............... | 715/747 |
| 6,990,676 B1 * | 1/2006 | Proehl et al. ..................... | 725/40 |
| 7,003,792 B1 * | 2/2006 | Yuen .............................. | 725/46 |
| 7,028,326 B1 * | 4/2006 | Westlake et al. ................ | 725/39 |
| 7,072,846 B1 * | 7/2006 | Robinson ..................... | 705/7.32 |
| 7,191,244 B2 * | 3/2007 | Jennings et al. ............. | 709/231 |
| 7,254,829 B1 * | 8/2007 | Brown et al. ................. | 725/141 |
| 7,340,742 B2 * | 3/2008 | Tabuchi ........................ | 718/103 |
| 7,389,265 B2 * | 6/2008 | Lawrence et al. ............... | 705/38 |
| 7,406,500 B2 * | 7/2008 | Bantz et al. .................... | 709/205 |
| 7,444,313 B2 * | 10/2008 | Meek et al. ..................... | 706/46 |
| 7,454,777 B1 * | 11/2008 | Nishikawa et al. ........... | 725/151 |
| 7,464,393 B2 * | 12/2008 | Westlake et al. ................ | 725/39 |
| 7,493,372 B2 * | 2/2009 | Crabtree et al. ............. | 709/217 |
| 7,493,640 B1 * | 2/2009 | Derrenberger et al. ......... | 725/42 |
| 7,496,275 B2 * | 2/2009 | Cooper et al. ................ | 386/291 |
| 7,506,350 B2 * | 3/2009 | Johnson ......................... | 725/53 |
| 7,512,678 B2 * | 3/2009 | Crabtree et al. ............. | 709/224 |
| 7,552,458 B1 * | 6/2009 | Finseth et al. .................. | 725/34 |
| 7,577,974 B2 * | 8/2009 | Grossman et al. ............. | 725/62 |
| 7,596,591 B2 * | 9/2009 | Titmuss ........................ | 709/224 |
| 7,640,343 B2 * | 12/2009 | Scott, III ....................... | 709/226 |

(Continued)

*Primary Examiner* — Mark Andrew X Radtke

(74) *Attorney, Agent, or Firm* — Conley Rose, P.C.

(57) ABSTRACT

A method and system for rating media. The media is one or a combination of audio, video and textual data. The media rating method comprises surveying at least a portion of media data received from a device and detecting generation of rating data, the rating data for appraising the media data. The method further comprises transmitting the rating data to the device. The system comprises a device-readable medium having programming instructions stored therein. The instructions when executed on a first device cause the first device to survey at least a portion of media data received from a second device, detect generation of rating data and transmit the rating data to the second device.

27 Claims, 5 Drawing Sheets

U.S. PATENT DOCUMENTS

| | | | |
|---|---|---|---|
| 7,653,761 B2* | 1/2010 | Juster et al. | 710/18 |
| 7,689,556 B2* | 3/2010 | Garg et al. | 707/765 |
| 7,694,321 B1* | 4/2010 | Neil et al. | 725/43 |
| 7,698,301 B2* | 4/2010 | Lourdeaux | 707/999.107 |
| 7,706,740 B2* | 4/2010 | Collins et al. | 455/3.01 |
| 7,711,249 B2* | 5/2010 | Kawasaki et al. | 386/337 |
| 7,721,310 B2* | 5/2010 | Schaffer et al. | 725/46 |
| 7,734,631 B2* | 6/2010 | Richardson et al. | 707/749 |
| 7,761,399 B2* | 7/2010 | Evans | 706/55 |
| 7,769,738 B2* | 8/2010 | Ramberg | 707/706 |
| 7,783,632 B2* | 8/2010 | Richardson et al. | 707/727 |
| 7,797,299 B2* | 9/2010 | Thrasher | 707/706 |
| 7,810,119 B2* | 10/2010 | Johnson | 725/53 |
| 7,813,482 B2* | 10/2010 | Girouard et al. | 379/88.09 |
| 7,823,174 B2* | 10/2010 | Candelore et al. | 725/36 |
| 7,840,488 B2* | 11/2010 | Tieu et al. | 705/51 |
| 7,860,741 B1* | 12/2010 | Robinson | 705/7.31 |
| 7,885,849 B2* | 2/2011 | Gross | 1/1 |
| 7,890,363 B2* | 2/2011 | Gross | 705/7.31 |
| 7,966,342 B2* | 6/2011 | Gross | 707/770 |
| 8,103,540 B2* | 1/2012 | Gross | 705/7.33 |
| 8,117,185 B2* | 2/2012 | Franks et al. | 707/713 |
| 8,140,388 B2* | 3/2012 | Gross | 705/14.41 |
| 2002/0083002 A1* | 6/2002 | Menez et al. | 705/52 |
| 2002/0097265 A1* | 7/2002 | Kurapati et al. | 345/747 |
| 2002/0111856 A1* | 8/2002 | Messer et al. | 705/14 |
| 2003/0037117 A1* | 2/2003 | Tabuchi | 709/207 |
| 2003/0223734 A1* | 12/2003 | Cooper, Jr. et al. | 386/83 |
| 2003/0233278 A1* | 12/2003 | Marshall | 705/14 |
| 2004/0032486 A1* | 2/2004 | Shusman | 348/14.09 |
| 2004/0073922 A1* | 4/2004 | True | 725/45 |
| 2004/0078806 A1* | 4/2004 | Johnson et al. | 725/9 |
| 2004/0078816 A1* | 4/2004 | Johnson | 725/52 |
| 2004/0093616 A1* | 5/2004 | Johnson | 725/53 |
| 2004/0210947 A1* | 10/2004 | Shusman | 725/136 |
| 2004/0215542 A1* | 10/2004 | Rossides | 705/35 |
| 2004/0216108 A1* | 10/2004 | Robbin | 718/100 |
| 2005/0071872 A1* | 3/2005 | Case | 725/50 |
| 2005/0076367 A1* | 4/2005 | Johnson et al. | 725/58 |
| 2005/0125287 A1* | 6/2005 | Sureka et al. | 705/14 |
| 2005/0154717 A1* | 7/2005 | Watson et al. | 707/3 |
| 2005/0197955 A1* | 9/2005 | Rossides | 705/40 |
| 2005/0204389 A1* | 9/2005 | Proehl et al. | 725/60 |
| 2005/0240494 A1* | 10/2005 | Cue et al. | 705/27 |
| 2005/0278750 A1* | 12/2005 | Grossman et al. | 725/62 |
| 2006/0015480 A1* | 1/2006 | Conahan et al. | 707/2 |
| 2006/0123447 A1* | 6/2006 | Westlake et al. | 725/40 |
| 2006/0130118 A1* | 6/2006 | Damm | 725/135 |
| 2006/0136981 A1* | 6/2006 | Loukianov | 725/135 |
| 2006/0140219 A1* | 6/2006 | Kawasaki et al. | 370/487 |
| 2006/0195887 A1* | 8/2006 | Shusman | 725/138 |
| 2006/0212367 A1* | 9/2006 | Gross | 705/27 |
| 2006/0248573 A1* | 11/2006 | Pannu et al. | 726/1 |
| 2006/0278064 A1* | 12/2006 | Lourdeaux | 84/609 |
| 2006/0287916 A1* | 12/2006 | Starr et al. | 705/14 |
| 2007/0011236 A1* | 1/2007 | Ravula | 709/204 |
| 2007/0064626 A1* | 3/2007 | Evans | 370/254 |
| 2007/0106454 A1* | 5/2007 | Nonaka | 701/200 |
| 2007/0136749 A1* | 6/2007 | Hawkins et al. | 725/38 |
| 2007/0155307 A1* | 7/2007 | Ng et al. | 455/3.01 |
| 2007/0156445 A1* | 7/2007 | Manuel et al. | 705/1 |
| 2007/0161402 A1* | 7/2007 | Ng. et al. | 455/554.2 |
| 2007/0186228 A1* | 8/2007 | Ramaswamy et al. | 725/14 |
| 2007/0260526 A1* | 11/2007 | Bartel | 705/26 |
| 2007/0265855 A1* | 11/2007 | Maandag et al. | 705/1 |
| 2007/0268836 A1* | 11/2007 | Byun et al. | 370/252 |
| 2008/0010139 A1* | 1/2008 | Elmer et al. | 705/14 |
| 2008/0010143 A1* | 1/2008 | Kniaz et al. | 705/14 |
| 2008/0066099 A1* | 3/2008 | Brodersen et al. | 725/35 |
| 2008/0071929 A1* | 3/2008 | Motte et al. | 709/246 |
| 2008/0140502 A1* | 6/2008 | Birnholz et al. | 705/10 |

* cited by examiner

Fig. 6

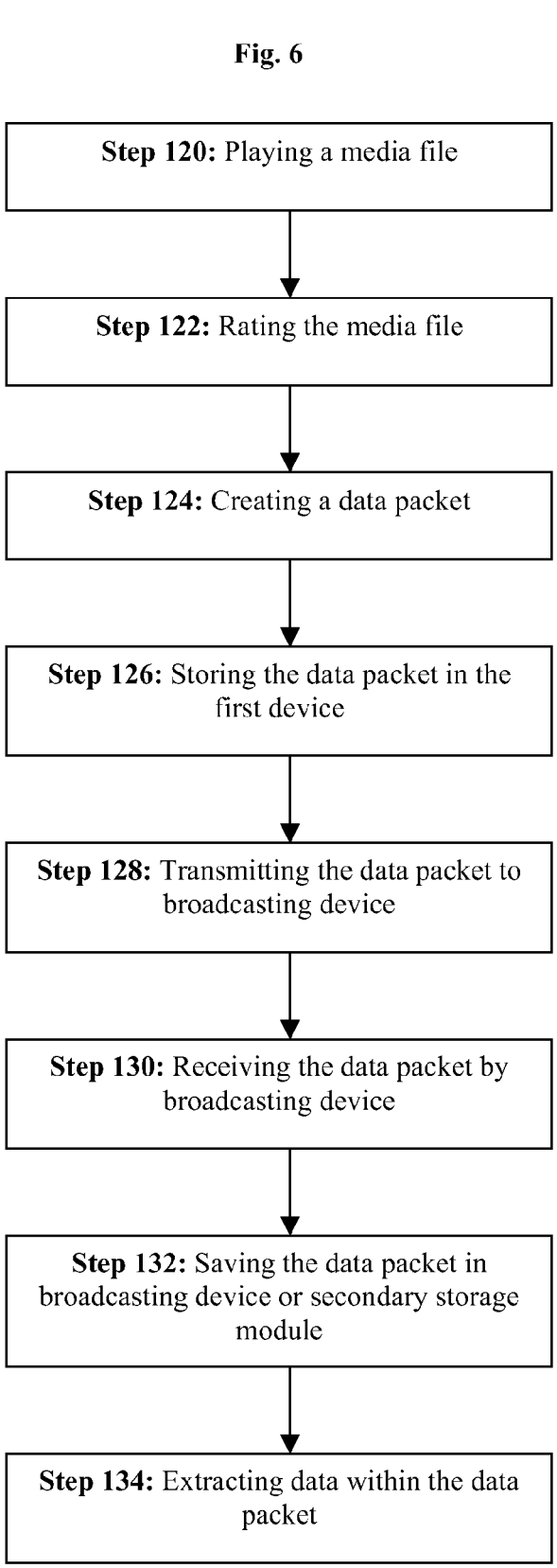

Step 120: Playing a media file

↓

Step 122: Rating the media file

↓

Step 124: Creating a data packet

↓

Step 126: Storing the data packet in the first device

↓

Step 128: Transmitting the data packet to broadcasting device

↓

Step 130: Receiving the data packet by broadcasting device

↓

Step 132: Saving the data packet in broadcasting device or secondary storage module

↓

Step 134: Extracting data within the data packet

MEDIA RATING

RELATED APPLICATION

This application is a continuation-in-part of U.S. Ser. No. 11/625,692 filed Jan. 22, 2007, and claims the benefit thereof.

FIELD OF INVENTION

The present invention relates generally to the field of wireless communications. More specifically, the present invention relates to wireless communication of media files and rating of such media files.

BACKGROUND

Many prior art media devices can receive media broadcasts from sources such as FM, AM and satellite broadcasts. Such a media device is able to transfer and receive media files, for example audio files, video files and audio-visual files, wirelessly between other similar media devices. The wireless transmission is performed via a variety of methods including infrared transmission, 25 mhz radio or 2.4 ghz radio transmission technologies such as Bluetooth.

Media files such as audio or visual files can originate from a variety of devices including digital media players like an Apple iPod®, a CD player or even a radio transmitting commercial radio broadcasts. Most media files in the popular MP3 and ACC formats contain identification information stored as an ID3 tag. The ID3 tag is typically contained within or associated with the audio file and is stored in a prescribed format. Identification information on the media file typically includes an artist or creator name, a title of the media file and a year of commercial release and genre of the media file.

Most media devices are able to identify the media file being played, transmitted, broadcasted and/or received. The identification of the media file can be performed by several methods. For example, the identification of the media file can be performed by extracting the ID3 tag or metadata directly from the media device that is playing, transmitting, broadcasting or receiving the media file. Alternatively, a creation of "signatures" for the audio file followed by cross-referencing of these "signatures" to a music database results in the identification of the media file. Further alternatively, the media file is identified by a user's direct input of relevant information.

The identification information on any particular media file is often limited and incomplete. Additionally, the identification information is typically static and factual in nature. There is little opportunity for a receiver of the media file to assess his potential likelihood and/or degree of enjoyment or satisfaction gained by receiving, playing, listening and/or watching the media file. There is also little opportunity for a broadcaster of media files to receive feedback regarding popularity of the media files that he has broadcasted and/or regarding degree of enjoyment conferred upon the receiver of his broadcasted media file.

Furthermore, there are limited in-built incentives for broadcasters or sharers of media files to continually increase rate of broadcasting or sharing activity and/or quality of broadcasted or shared media files.

In view of the foregoing, there is a need for a system and method for providing an indication of the potential likelihood and/or degree of enjoyment or satisfaction gained by receiving, playing, listening and/or watching any particular media file. There is also a need to increase in-built incentives aimed at broadcasters or sharers to continuously increase their broadcasting or sharing activity as well as quality of broadcasted or shared media files.

SUMMARY

In accordance with a first aspect of the invention, there is disclosed a media rating method comprising surveying at least a portion of media data receivable from a device, the media data comprising at least one of audio, video and textual data. The media rating method further comprises detecting generation of rating data, the rating data for appraising the media data. The media rating method also comprises transmitting the rating data for reception by the device.

In accordance with a second aspect of the invention, there is disclosed a device-readable medium having stored therein a plurality of programming instructions, which when executed on a first device, the instructions cause the first device to survey at least a portion of media data receivable from a second device, the media data comprising at least one of audio, video and textual data. The plurality of programming instructions, which when executed on the first device, the instructions further cause the first device to detect generation of rating data, the rating data for appraising the media data and to transmit the rating data for reception by the second device.

In accordance with a third aspect of the invention, there is disclosed a media rating system comprising means for surveying at least a portion of media data receivable from a device, the media data comprising at least one of audio, video and textual data. The media rating system further comprises means for detecting generation of rating data, the rating data for appraising the media data and means for transmitting the rating data for reception by the device.

In accordance with a fourth aspect of the invention, there is disclosed a media rating method comprising broadcasting media data receivable by a plurality of devices, the media data comprising at least one of audio, video and textual data. The media rating method further comprises receiving at least one rating score from at least one of the plurality of devices, the at least one rating score being associated with the media data for appraisal thereof. The media rating method also comprises capturing the least one rating score as rating data.

BRIEF DESCRIPTION OF DRAWINGS

Embodiments of the invention are described hereinafter with reference to the following drawings, in which:

FIG. 6 illustrates a method for rating a media file being played by a device, broadcasted to the device, transmitted by the device or received by the device.

DETAILED DESCRIPTION

With reference to the drawings, preferred embodiments of the invention for providing a system and a method for rating of a media file as well as applications thereof are described hereinafter.

Systems and methods for transmitting media files and their related information are known in the art. Media files can be one or a combination of audio data, video data and textual data. Related information of a media file is transmitted as metadata, usually as a header or a footer of the media file. Related information can include a title of the media file, an artist of the media file and a size of the media file. However, the metadata is often restricted to static and factual data. That is to say, the metadata typically does not comprise information regarding the media file that is variable or inconsistent in nature. For example, the metadata presently do not comprise an indication of current popularity of the media file. A user of a media device that receives and plays the media file is at present neither able to rate the media file nor able to supply or transmit the rating as part of the metadata. The present invention therefore provides a system and a method for rating a media file and for sharing the rating between media devices and their users.

For purposes of brevity and clarity, description of the invention is limited hereinafter to media devices capable of broadcasting, receiving, transmitting or playing a media file. This however does not preclude various embodiments of the invention from other applications that require a similar operating performance. Functional and operational principles upon which embodiments of the invention are based on remain the same throughout the various embodiments.

The device is preferably a standalone device which can include media (for example, audio and video) playback, telecommunication or personal digital assistant (PDA) functionalities. Alternatively, the device is a dongle couplable to a media device, a telecommunication device, a PDA or a similar device.

Dedicated and Broadcast Use

Figure 1:
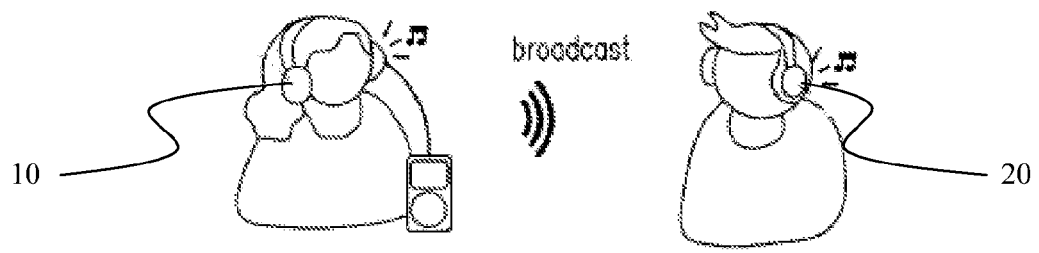
FIG. 1 illustrates a schematic view of a person sharing media and related information in accordance with one aspect of the present invention.

As shown in FIG. 1, the user of a first device 10 can opt to only transmit a dedicated signal from the first device to a second device 20; in this instance, the second device 20 will be the only receiving device for the first device 10. The second device 20 decodes the signal from the first device 10 to provide the user of the second device 20 with the appropriate/desired media.

As used herein, the term "dedicated" is used to refer to a closed network, whereby only users of that network may have ready access to the decoding and/or decrypting technology to access the communicated signals. A "closed network can refer to a network that employs proprietary technology that is not directly interoperable with other standards-based networks, or that adds an additional layer of encoding onto standards-based networks. A "closed network" also encompasses a private network that can only be used by authenticated or authorized devices; e.g. outsider use may be prohibited and enforced through cryptographic means. A closed network is thus distinct from an open network such as Bluetooth, whereby any device that is Bluetooth-enabled may (in the absence of proprietary encoding or encryption) receive and process that signal.

Information relating the media file may also be encrypted to provide a further layer of security to information communication between devices. Encryption can be used to secure information communications and stored information. Digital communications accommodate the use of encryption. As consumers continue to move from wireline to wireless communications devices, the use of encryption has become more important to the end user in some contexts.

Figure 2:
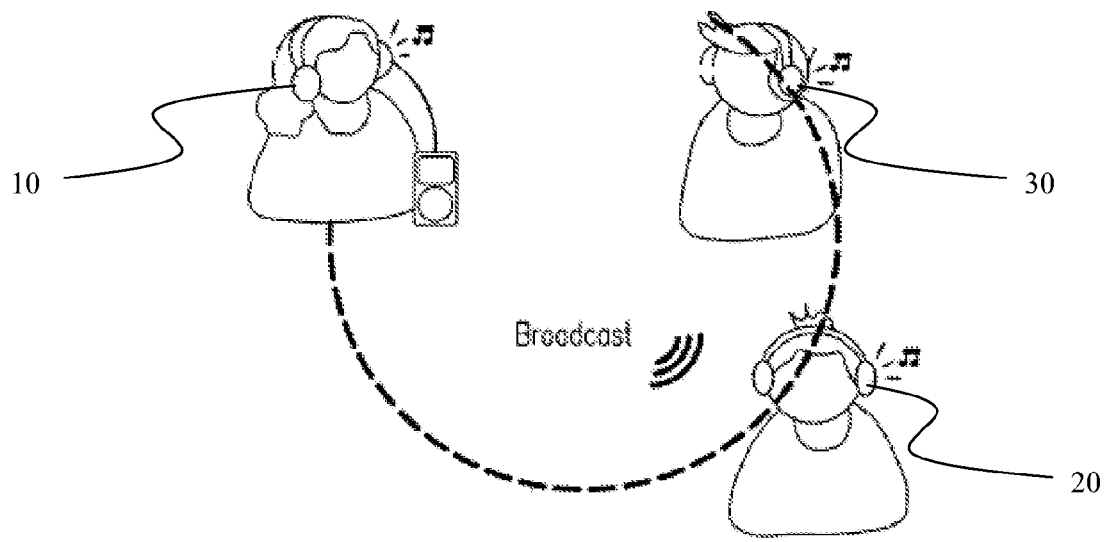
FIG. 2 illustrates a schematic view of a plurality of persons sharing media (and data) from a single source in accordance with one aspect of the present invention.
Figure 3:
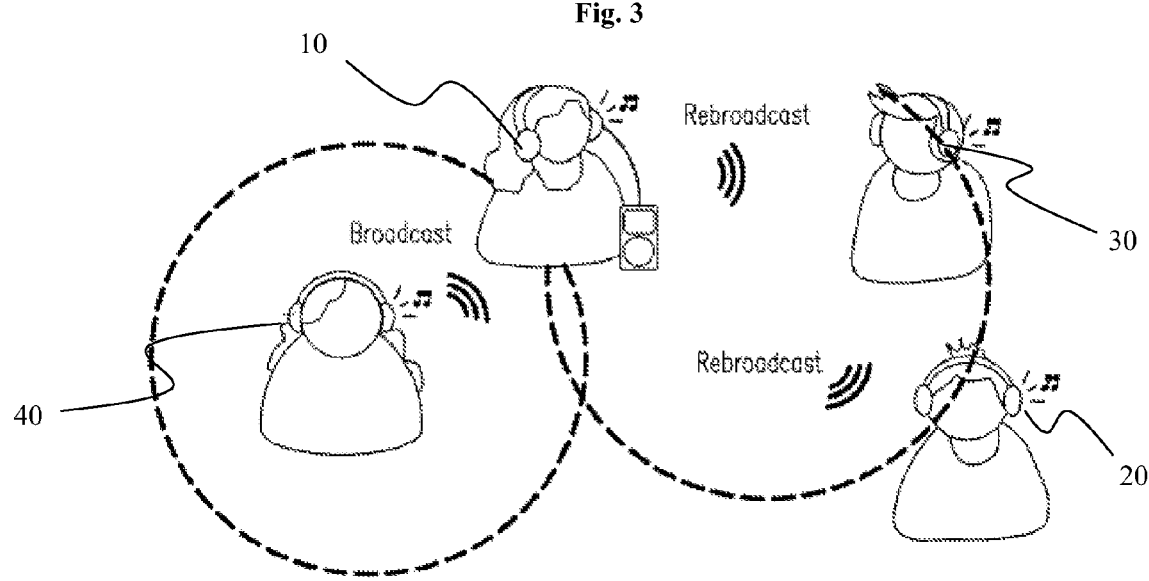
FIG. 3 and FIG. 4 illustrate other embodiments of the invention in which a plurality of rebroadcasts occur.

Referring now to FIG. 2, a user of the first device 10 can opt to set the first device 10 to broadcast. As such, enabled third parties in the range of transmission of the first device 10, such as the user of a third device 30 and potentially others, can opt to set their respective devices to receive from the first device 10, or on a channel on which the first device 10 is set to transmit. The third device 30 and others can now decode the signal from the first device 10 to provide the user of the third device 30 and some others with the appropriate/desired media file. As shown in FIG. 3, the user of the first device 10 can also opt to set the first device 10 to receive from other transmitting devices (e.g. a fourth device 40) belonging to other users.

Rebroadcasting

Figure 4:
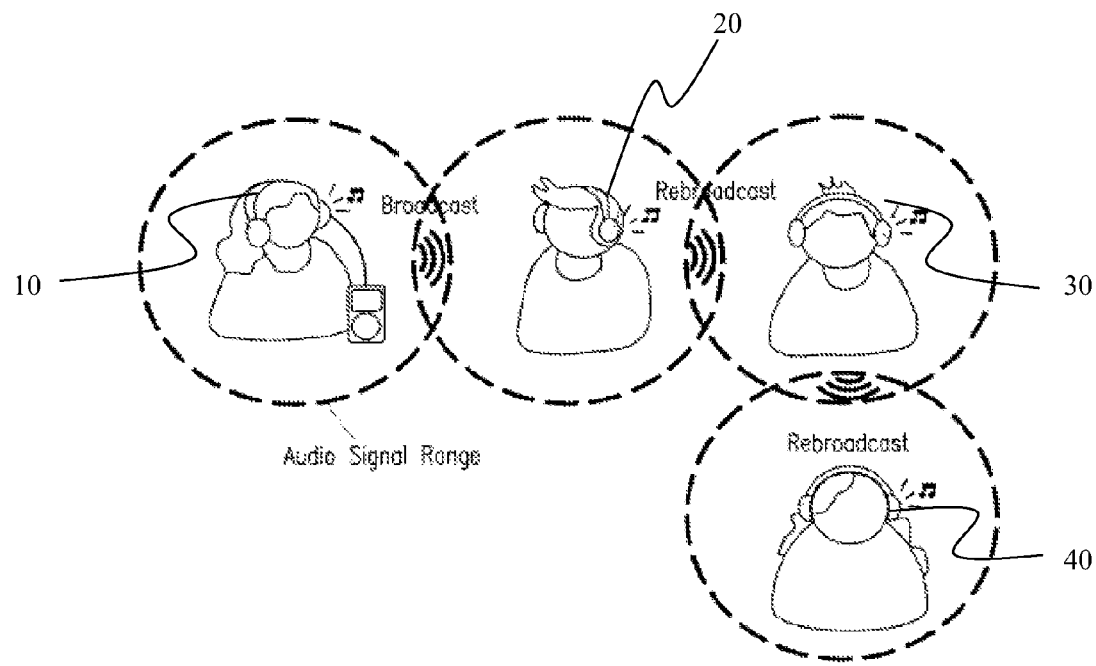

The system and method of the present invention can also be used in the context of re-broadcasting. For example, as shown in FIG. 4, with the user can set the first device 10 on broadcast, the user of the second device 20 which is receiving the media file can opt to set the second device 20 to receive the media file from the first device 10 and to simultaneously re-broadcast the same media file to other users' devices (for example, the third device 30 and the fourth device 40). Alternatively, the second device 20 can simultaneously receive the media file from first device 10 as well as transmit media files already stored within the second device 20 to other users' devices.

Rebroadcasting may be undertaken before or after decoding the signals; if the latter, the signals will be encoded prior to being retransmitted. The encoding may be the same as, or in some applications different from, the original encoding.

Rebroadcasting thus allows user of a device who is out of the range of the first device 10 but in the range of the re-broadcast of 20 to receive the appropriate media file from the first device 10 via the second device 20. Likewise, if the user of the third device opts to set the third device 30 to re-broadcast, the user of the fourth device 40, who is out of the range of the broadcast of the first device 10 and the rebroadcast of the second device 20, can opt to set the fourth device 40 to receive the appropriate media file from the first device 10 via the second device 20 and the third device 30. For all the applications above, the users of the second device 20, the third device 30 and the fourth device 40 can also set their respective devices to receive the appropriate media files which are being re-broadcasted.

Figure 5:
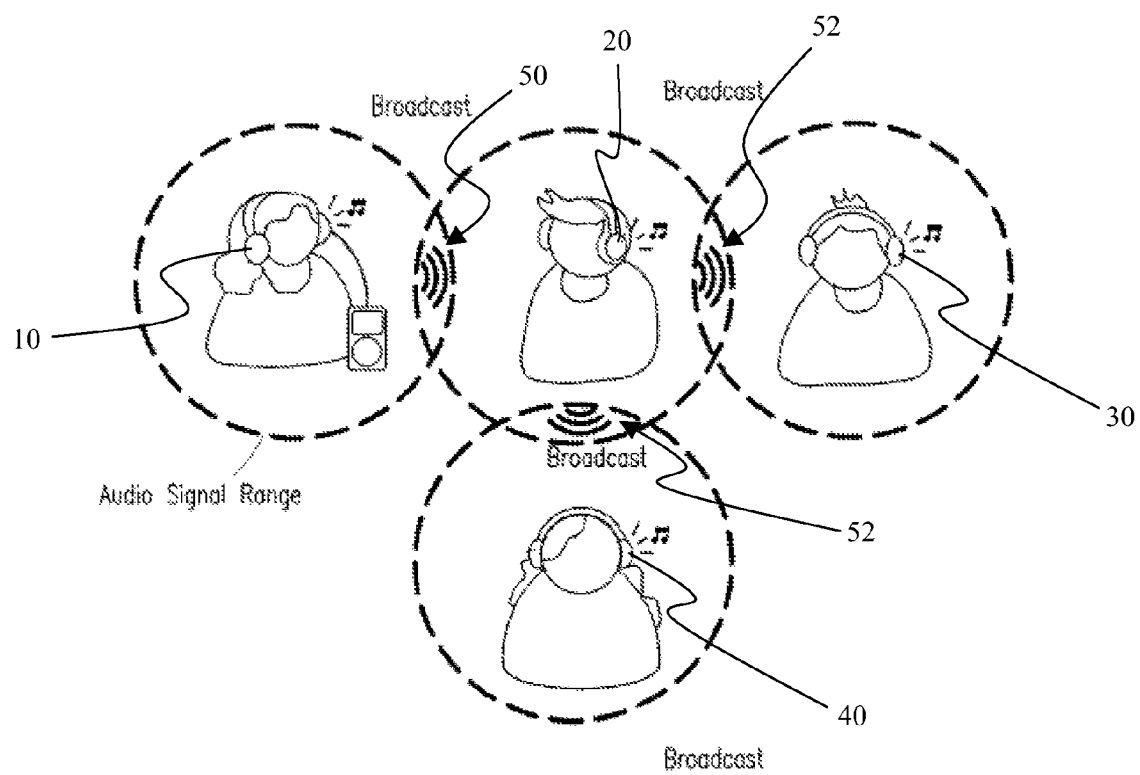
FIG. 5 illustrates another embodiment of the invention in which a plurality of broadcasts occurs, and in which differing audio signals and related information may be communicated among the various devices.
Figure 7:
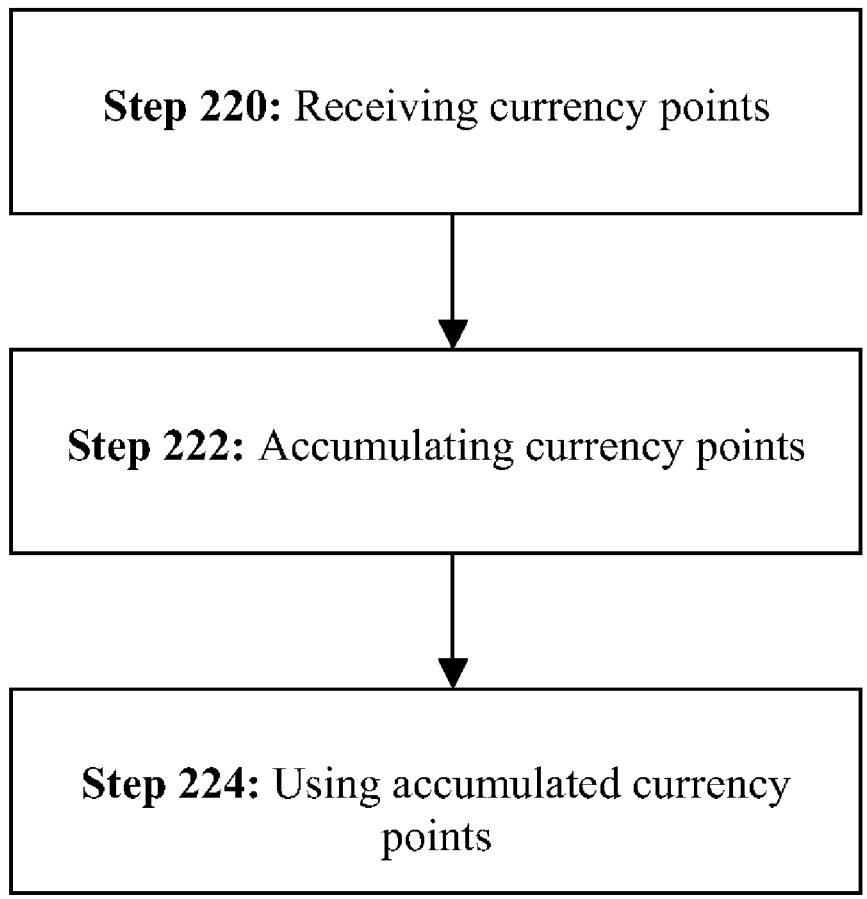
FIG. 7 illustrates a "currency" rating method executable by the device of FIG. 6.

FIG. 5 depicts an alternative embodiment of the invention that enables use with the simultaneous reception and transmission/broadcast of different media files. As shown in FIG. 5, the user of the first device 10 can set the first device 10 to transmit or broadcast a certain signal 50. The user of the second device 20 can set his device to receive the transmission/broadcast of the certain signal 50 from the first device 10. The user of the second device 20 can simultaneously opt to set the second device 20 to transmit or broadcast a different signal 52 on a different channel which can be received by users of, for example, the third device 30 and the fourth device 40 provided that they have set their respective devices to receive the transmission or broadcast of the different signal 52 on that channel from the user of the second device 20.

The setting of the device to receive, to transmit or to simultaneously transmit and receive can be selected manually by the user of the device by operating a user interface formed on the device. Alternatively, the setting of the device to receive, to transmit or to simultaneously transmit and receive is performed automatically upon detection of signals from another device.

The invention also enables use in multi-channel transmission or broadcast (simultaneous or otherwise). With multiple users transmitting in a limited range, the implementation of the wireless transmission may be made un-dedicated channels which users may opt to receive either:

automatically via hunting and/or frequency hopping; or i. manually by tuning to specific frequencies denoted by:

a. discrete channels denoted by numbers (e.g. Channel 1, Channel, etc);

b. discrete channels denoted with colors (e.g. Red, Green, Blue); or c. other methods consistent with those known to persons of skill in the art.

In order to identify the mode in which a device is operating (transmitting, broadcasting, re-broadcasting or receiving), the user of a device can opt to set either cues on his device or cues to be displayed/received on third parties' device to allow third parties to identify the mode in which a device is operating. The cues could take various forms or combination of forms such as:

a. visual cues, including text, colored indicators or lights, which will indicate the various modes in which the device is operating; and b. sound cues which will indicate the various modes in which the device is operating. Such sounds can either be heard audibly or through use of the device.

(E.g., the first device 10 is set to broadcast. The first device 10 flashes a blue light which users of other Devices (e.g. the second device 20 and the third device 30) can see and then opt to set the second device 20 and the third device 30 to receive the first device's broadcast.)

Media File Rating

In a preferred embodiment of the present invention, the user of the first device 10 is able to give a rating to a media file that is played, broadcasted thereto, transmitted or received by the first device 10. The media file can be an audio track or an audio song. Alternatively, the media file is an audio-visual file. The rating given to the media file preferably reflects a degree to which the user of the first device 10 enjoys the media file. Alternatively, the rating reflects a perceived quality or value of the media file.

The user of the first device 10 rates the media file being played, broadcasted thereto, received or transmitted via a method 100. The first device 10 first plays the media file in a step 120. The media file that is played is preferably broadcasted to the first device 10 from a broadcasting device. Alternatively, the media file being played is received from other similar devices, for example the second device 20 or the third device 30. Further alternatively, the media file being played is already stored within a memory module of the first device 10.

In a step 122, the user of the first device 10 operates a user interface formed on the first device 10 for generating a rating for the media file being played. Preferably, the user interface is a touch screen. Alternatively, the rating is entered into the first device 10 via a keypad. The ratings may be entered in a traditional form, for example providing a number or rating from one to ten, a percentage, a percentile, or number of one to five or ten stars (or other iconography).

The generated rating is captured by the first device 10 in a data packet in a step 124. The creation of the data packet can be performed automatically upon entry of the rating. Alternatively, the user of the first device 10 controls or authorizes the creation of the data packet. Preferably, the data packet further comprises data or information on the media file that is being played and rated. The data includes, but is not limited to, a title of the media file, a composer or artiste of the media file, a unique identifier of the media file, a hash code of the first device 10 and a time-stamp for indicating rating entry.

Preferably, the data packet is stored in the memory module of the first device 10 in a step 126. The user of the first device 10 can access the memory module as and when desired to thereby review the media file's previously given rating and data. This enables the user of the first device 10 to recall all his previously given ratings, and corresponding enjoyment of the media file, together with data on the media files. Consequently, the user of the first device is 10 able to easily recall, find and/or replay previously enjoyed media files.

Ability of users of devices to rate media files and then store these ratings together with data on the corresponding media files solves a common problem in FM radio broadcasts wherein users enjoy a particular media file but misses or forgets the particular media file identity. With the present invention, the particular media file is rated and the rating together with data on the particular media file is stored for subsequent retrieval and recall.

In a step 128, the data packet is wirelessly transmitted back to the broadcasting device. The broadcasting device then receives the data packet in a step 130. The data packet is then saved in a step 132. Preferably, the data packet is saved in a memory module of the broadcasting device. Alternatively, the data packet is transferred to and stored in a secondary storage module. The secondary storage module can be an external storage device. Alternatively, the secondary storage module is an Internet database or a software program.

The user of the broadcasting device (hereinafter referred to as a broadcaster) extracts or accesses the data or information stored within the data packet in a step 134. The data is used for a variety of different purposes. For example, the broadcaster is able to consolidate and analyze ratings given to broadcasted media files, thereby assessing relative popularity of broadcasted media files. If the broadcaster is broadcasting a self-composed media file, for example an audio song, receiving data packets that comprises ratings on the self-composed media file gives the broadcaster valuable feedback as to degree of enjoyment, if at all, that others, for example the user of the first device 10, derive from playing, listening to and/or watching the self-composed media file.

A profile of the user of the first device 10 is optionally stored in the memory module of the first device 10. Preferably, the user profile is incorporated into the data packet created and transmitted together with associated media file rating and data to the broadcasting device. Further preferably, the transmitted user profile is stored in the memory module of the broadcasting device or in the secondary storage module together with its corresponding rating and data on the media file.

The first device 10 preferably comprises Global Positioning System (GPS) functionalities. The GPS functionalities enable the first device 10 to derive GPS coordinates to reflect its physical location. Preferably, the GPS coordinates of the first device 10 are incorporated into the data packet created in the step 124 and are transmitted together with associated media file rating and data to the broadcasting device.

The broadcasting device typically receives a large number of data packets from multiple devices, including the first device 10, the second device 20 and the third device 30. For example, at least one hundred, at least one thousand, at least one hundred thousand, at least one million or at least ten million devices provides or transmits data packets, with ratings comprised therein, to the broadcasting device. The data packets received can be stored in the memory module of the broadcasting device or in the secondary storage module.

Preferably, the data within the data packets that are received from the many devices can be aggregated and statistically analyzed by a software program or Internet website.

The broadcaster is able to analyze the ratings of different media files to assess relative popularity and users' preferences regarding the different media files. Furthermore, the broadcaster is able to cross-reference between user profiles and the relative popularity and users' preferences regarding the different media files. The statistical analysis of the ratings further enables the broadcaster to obtain information such as a mean, a median and a standard deviation of user ratings for any particular media file as well as for a selected group of media files.

Ability to aggregate, statistically analyze and evaluate given ratings to media files enables broadcasters to specifically tailor their broadcasted media files to better suit or match individual device users' preferences. The ability to aggregate, statistically analyze and evaluate the given ratings to media files also allows composers to hone or refine their media or musical content so as to provide users or listeners with an enhanced degree of enjoyment.

The data packets together with the aggregated and statistically analyzed data are optionally displayed on the Internet. Alternatively, the data packets together with the aggregated and statistically analyzed data are stored on a software program. The data packets and the aggregated and statistically analyzed data can be made accessible to all members of the public. Alternatively, access to the data packets and the aggregated and statistically analyzed data is controlled, for example, password restricted or restricted via device type or identity.

In a preferred embodiment of the present invention, the first device 10 comprises the functionalities of the broadcasting device.

"Currency" Rating

In a preferred embodiment of the present invention, the first device 10 is able to execute a "currency" rating method 200. The "currency" rating method 200 is preferably performed in conjunction with the method 100. Alternatively, the "currency" rating method is performed independently from the method 100.

In a step 220 of the method 200, the first device 10 receives currency points. The first device 10 then accumulates a pool of currency points in a step 222. Currency points can also be known as credit. As such, number of currency points is also known as credit amount. The accumulation of currency points can occur as a function of time, for example an addition of one or more currency points into the pool every one or a given alternative number of days. Alternatively, the first device 10 receives currency points from another device, for example the second device 20 or the third device 30.

In the latter alternative scenario wherein the first device 10 receives currency points from another device, the first device 10 first transmits or broadcasts a media file to the second device 20. The second device 20 then performs steps 120, 122, 124 and 128 of the method 100. One or more currency point is then transmitted together with the data packet from the second device 20 to the first device 10. The number of currency points transmitted from the second device 20 to the first device 10 is preferably dependent on rating given by the user of the second device 20 on the media file that is transmitted or broadcasted from the first device 10 to the second device 20. Therefore, the number of accumulated currency points of the first device 10 provides a reflection as to popularity of media files transmitted or broadcasted by the first device 10. The accumulated currency points also provides a reflection as to activeness of transmission or broadcasting of media files by the user of the first device 10.

Preferably, there is a maximum limit on the number of currency points that the first device 10 is able to accumulate. The maximum limit is for example twenty, fifty, one hundred, one thousand or ten thousand currency points. Once the maximum limit is reached, the first device 10 may not be able to receive additional currency points.

The user of the first device 10 uses the accumulated currency points in a step 224. The accumulated currency points can be used for a variety of purposes. For example, the accumulated currency points can be used to rate media files played, received by or broadcasted to the first device 10. Preferably, the number of currency points used by the user of the first device 10 is proportionately indicative of the rating that he gives to the media file being played, received or broadcasted.

Alternatively, the accumulated currency points can be exchanged for tangible or even financial returns or benefits. The fact that the currency points are expandable and can only be replenished at a known rate or limited manner confers upon the currency points a perceived intrinsic value.

Ability to accumulate currency points allows for various recognition and reward systems. Such recognition and reward systems can be perceived or tangible. For example, an "achievement" list could be displayed, the list indicative of activeness of broadcasters or popularity of broadcasters (for example, top ten broadcasters having a highest mean rating for their broadcasting media files). Additionally, a tangible prize or reward can be given to broadcasters who top such "achievement" lists.

The accumulated currency points or credit amount can be displayed on a network accessible site. The network accessible site is preferably publicly accessible. As previously mentioned, the number of currency points or credit amount can be indicative of activeness of broadcasters. That is to say, currency points or credit amount can increase in response to increased activity of the broadcaster. As also previously mentioned, the number of currency points or credit amount can also be indicative of the ratings given to broadcasted media files. That is to say, currency points or credit amount can increase in response to increased ratings given to the broadcasted media files by the first device 10.

In the foregoing manner, a system and method for media rating as well as various applications thereof are described according to exemplary embodiments of the invention for addressing the foregoing shortcomings of media sharing experiences. This system and method can also apply to other types of data stored on the device and even data or information regarding users of the device. Although only embodiments of the invention are disclosed, it will be apparent to one skilled in the art in view of this disclosure that numerous changes and/or modifications can be made without departing from the scope and spirit of the invention.

The invention claimed is:

1. A media rating method comprising:
    surveying by a receiving device configurable for receiving media data at least a portion of media data receivable from a sharing device, the media data comprising metadata and at least one of audio, video and textual data, the metadata comprising a plurality of data elements, at least one of the data elements for at least one of uniquely identifying and being descriptive of the at least one of audio, video and textual data;
    providing a rating score by a user of the receiving device, the rating score indicating how well the user liked the media data;
    generating a credit amount based on the rating score;
    extracting at least one of the plurality of data elements from the metadata; and generating a data packet, the data packet comprising the rating score, the credit amount, and the extracted at least one of the plurality of data elements from the metadata, the data packet for appraising the media data, wherein generating the data packet comprises providing a credit amount, comparing the credit amount to a rating amount in response to operation of a user interface, generating the rating score in response to the credit amount being one of equal to and more than the rating amount, and deducting the rating amount from the credit amount in response to the rating score being generated; and wherein the data packet is subsequently transmittable to the sharing device.

2. The method as in claim 1, wherein surveying at least a portion of media data receivable from the sharing device comprises:

receiving the at least a portion of the media data from the sharing device.

3. The method as in claim 2, wherein surveying at least a portion of media data receivable from the sharing device further comprises playback of the at least a portion of the media data received from the sharing device.

4. The method as in claim 1, further comprising:
providing an activity counter having a counter amount; and
incrementing the counter amount of the activity counter in response to the data packet being generated.

5. The method as in claim 4, further comprising:
posting the counter amount of the activity counter on a network accessible site for public access.

6. The method as in claim 1, comprising:
providing a plurality of rating scores; and
detecting selection of one of the plurality of rating scores.

7. The method as in claim 6, comprising:
capturing at least one of time and date in response to the rating score being provided; and
generating the data packet further from the at least one time and data.

8. The method as in claim 6, comprising:
identifying location whereat the rating score is provided; and
generating the data packet further from the identified location.

9. The method of claim 1, further comprising transmitting the data packet from the receiving device to the sharing device.

10. A device-readable medium having stored therein a plurality of programming instructions, which when executed on a first device configured for receiving media, the instructions cause the first device to:

survey at least a portion of media data receivable from a second device configured for sharing media data, the media data comprising metadata and at least one of audio, video and textual data, the metadata comprising a plurality of data elements, at least one of the data elements for at least one of uniquely identifying and being descriptive of the at least one of audio, video and textual data;

provide a rating score by a user of the first device, the rating score indicating how well the user liked the media data;
generate a credit amount based on the rating score;
extract at least one of the plurality of data elements from the metadata; and
generate a data packet, the data packet comprising the rating score, the credit amount, and the extracted at least one of the plurality of data elements from the metadata, the data packet for appraising the media data, wherein generating the data packet comprises providing the credit amount, comparing the credit amount to a rating amount in response to operation of a user interface, generating the rating score in response to the credit amount being one of equal to and more than the rating amount, and deducting the rating amount from the credit amount in response to the rating score being generated;

wherein the data packet is subsequently transmittable to the second device.

11. The device-readable medium as in claim 10, wherein the plurality of programming instructions, which when executed, cause the first device further to:
receive the at least a portion of media data from the second device.

12. The device-readable medium as in claim 11, wherein the plurality of programming instructions, when executed, cause the first device further to:
playback the at least a portion of media data received from the second device.

13. The device-readable medium as in claim 10, wherein the plurality of programming instructions, when executed, cause the first device further to:
provide an activity counter having a counter amount; and
increment the counter amount of the activity counter in response to the data packet being generated.

14. The device-readable medium as in claim 13, wherein the plurality of programming instructions, when executed, cause the first device further to:
post the counter amount of the activity counter on a network accessible site for public access.

15. The device-readable medium as in claim 10, wherein the plurality of programming instructions, when executed, cause the first device further to:
provide a plurality of rating scores; and
detect selection of one of the plurality of rating scores.

16. The device-readable medium as in claim 10, wherein the plurality of programming instructions, when executed, cause the first device further to:
capture at least one of time and date in response to the rating score being provided; and
generate the data packet further from the at least one time and data.

17. The device-readable medium as in claim 10, wherein the plurality of programming instructions, when executed, cause the first device further to:
identify location whereat the rating score is provided; and
generate the data packet further from the identified location.

18. The computer readable medium of claim 10, wherein the program instructions when executed cause the first device further to transmit the data packet to the second device.

19. A media rating system comprising:
means for surveying by a receiving device at least a portion of media data receivable from a sharing device, the media data comprising metadata and at least one of audio, video and textual data, the metadata comprising a plurality of data elements, at least one of the data elements for at least one of uniquely identifying and being descriptive of the at least one of audio, video and textual data;

means for providing a rating score by a user of the receiving device, the rating score indicating how well the user liked the media data;

means for generating a credit score based on the rating score;
means for extracting at least one of the plurality of data elements from the metadata; and
means for generating a data packet, the data packet comprising the rating score, the credit amount, and the extracted at least one of the plurality of data elements from the metadata, the data packet for appraising the media data;
means for detecting generation of the data packet comprising means for providing a credit amount, means for comparing the credit amount to a rating amount in response to operation of the user interface being detected, means for generating the rating score in response to the credit amount being one of equal to and more than the rating amount, and means for deducting the rating amount from the credit amount in response to the rating score being generated;
wherein the data packet is subsequently transmittable to the sharing device.

20. The system as in claim 19, wherein means for surveying at least a portion of media data receivable from a device comprises:
means for receiving the at least a portion of media data from the sharing device.

21. The system as in claim 20, wherein means for surveying at least a portion of media data receivable from a device further comprises:
means for playback of the at least a portion of media data received from the sharing device.

22. The system as in claim 19, further comprising:
means for providing an activity counter having a counter amount; and
means for incrementing the counter amount of the activity counter in response to the data packet being generated.

23. The system as in claim 22, further comprising:
means for posting the counter amount of the activity counter on a network accessible site for public access.

24. The system as in claim 19, wherein means for detecting generation of the data packet comprises:
means for providing a plurality of rating scores; and
means for detecting selection of one of the plurality of rating scores.

25. The system as in claim 19, wherein means for detecting generation of the data packet comprises:
means for capturing at least one of time and date from a clock in response to the rating score being provided; and
means for generating the data packet further from the at least one time and data.

26. The system as in claim 19, wherein means for detecting generation of the data packet comprises:
a global positioning system (GPS) for identifying location whereat the rating score is provided; and
means for generating the data packet further from the identified location.

27. The system of claim 19, wherein the system further comprises means for transmitting the data packet from the receiving device to the sharing device.

* * * * *